United States Patent
Penn

(10) Patent No.: US 11,563,899 B2
(45) Date of Patent: Jan. 24, 2023

(54) PARALLELIZATION TECHNIQUE FOR GAIN MAP GENERATION USING OVERLAPPING SUB-IMAGES

(71) Applicant: Raytheon Company, Waltham, MA (US)

(72) Inventor: Matthew J. Penn, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 142 days.

(21) Appl. No.: 16/993,663

(22) Filed: Aug. 14, 2020

(65) Prior Publication Data

US 2022/0053144 A1 Feb. 17, 2022

(51) Int. Cl.
*H04N 5/243* (2006.01)
*H04N 5/225* (2006.01)
*G06T 5/50* (2006.01)

(52) U.S. Cl.
CPC .............. *H04N 5/243* (2013.01); *G06T 5/50* (2013.01); *H04N 5/2258* (2013.01); *G06T 2207/20021* (2013.01); *G06T 2207/20216* (2013.01)

(58) Field of Classification Search
None
See application file for complete search history.

(56) References Cited

U.S. PATENT DOCUMENTS

| | | |
|---|---|---|
| 6,931,163 B1 | 8/2005 | Wechgeln |
| 7,856,154 B2 | 12/2010 | Young |
| 8,213,710 B2 | 7/2012 | Dosluoglu |
| 8,369,579 B2 | 2/2013 | Frigerio |
| 8,660,421 B2 | 2/2014 | Staker et al. |
| 9,955,070 B2 | 4/2018 | Lelescu et al. |
| 9,972,101 B2 | 5/2018 | Bishop et al. |
| 2010/0020933 A1* | 1/2010 | Topfer ...................... G06T 5/50 382/130 |
| 2011/0261061 A1* | 10/2011 | Lees .................... G06F 15/7885 345/501 |
| 2013/0021484 A1* | 1/2013 | Sorek ......................... G06T 5/50 348/208.4 |
| 2013/0329033 A1* | 12/2013 | Shibata ................ H04N 5/2355 348/79 |

(Continued)

OTHER PUBLICATIONS

Boerner et al., "Initial Calibration of the Atmospheric Imaging Assembly (AIA) on the Solar Dynamics Observatory (SDO)," Solar Physics, Jul. 2011, 26 pages.

(Continued)

*Primary Examiner* — Quan Pham

(57) ABSTRACT

A method includes obtaining multiple spatially-displaced input images of a scene based on image data captured using multiple imaging sensors. The method also includes dividing each of the input images into multiple overlapping sub-images. The method further includes generating multiple overlapping sub-image gain maps based on the sub-images. In addition, the method includes combining the sub-image gain maps to produce a final gain map identifying relative gains of the imaging sensors. An adjacent and overlapping pair of sub-image gain maps are combined by renormalizing gain values in at least one of the pair of sub-image gain maps so that average gain values in overlapping regions of the pair of sub-image gain maps are equal or substantially equal.

20 Claims, 6 Drawing Sheets

(56) References Cited

U.S. PATENT DOCUMENTS

| | | | |
|---|---|---|---|
| 2014/0027620 A1* | 1/2014 | Takeda | H04N 5/3742 |
| | | | 250/208.1 |
| 2014/0044232 A1* | 2/2014 | Liu | H04N 5/32 |
| | | | 378/62 |
| 2016/0124209 A1* | 5/2016 | Arai | G06T 5/50 |
| | | | 348/80 |
| 2018/0150684 A1* | 5/2018 | Wang | G06N 3/0454 |
| 2018/0330472 A1 | 11/2018 | Elhage et al. | |
| 2018/0357796 A1 | 12/2018 | Bishop et al. | |
| 2019/0026865 A1 | 1/2019 | Cohen et al. | |
| 2020/0025850 A1 | 1/2020 | Zeller et al. | |

OTHER PUBLICATIONS

Caron et al., "Extracting flat-field images from scene-based image sequences using phase correlation," Review of Scientific Instruments, Jun. 2016, 5 pages.

Kuhn et al., "Gain Calibrating Nonuniform Image-Array Data Using Only the Image Data," Publications of the Astronomical Society of the Pacific, Oct. 1991, 12 pages.

Toussaint et al., "Improved Convergence for CCD Gain Calibration Using Simultaneous-Overrelaxation Techniques," The Astronomical Journal, Aug. 2003, 7 pages.

Xu et al., "Flat-Fielding of Solar Hα Observations Based on the Maximum Correntropy Criterion," The Astrophysical Journal, Aug. 2016, 10 pages.

Non-final Office Action dated Sep. 14, 2022, in connection with U.S. Appl. No. 16/994,261, 6 pages.

* cited by examiner

US 11,563,899 B2

PARALLELIZATION TECHNIQUE FOR GAIN MAP GENERATION USING OVERLAPPING SUB-IMAGES

TECHNICAL FIELD

This disclosure relates generally to image processing systems. More specifically, this disclosure relates to a parallelization technique for gain map generation using overlapping sub-images.

BACKGROUND

An imaging system often uses an array of imaging sensors to capture images of scenes. For example, an imaging system may use a two-dimensional array of imaging sensors to capture images of the sky, Earth, or space. However, in various imaging systems, different imaging sensors in an array may generate different output values even when receiving the exact same inputs. For instance, different imaging sensors may output different values even when viewing a completely uniform portion of the sky, Earth, or space. This is often due to the different imaging sensors having different gains, which causes the imaging sensors to output different values.

SUMMARY

This disclosure provides a parallelization technique for gain map generation using overlapping sub-images.

In a first embodiment, a method includes obtaining multiple spatially-displaced input images of a scene based on image data captured using multiple imaging sensors. The method also includes dividing each of the input images into multiple overlapping sub-images. The method further includes generating multiple overlapping sub-image gain maps based on the sub-images. In addition, the method includes combining the sub-image gain maps to produce a final gain map identifying relative gains of the imaging sensors. An adjacent and overlapping pair of sub-image gain maps are combined by renormalizing gain values in at least one of the pair of sub-image gain maps so that average gain values in overlapping regions of the pair of sub-image gain maps are equal or substantially equal.

In a second embodiment, an apparatus includes at least one memory configured to store multiple spatially-displaced input images of a scene based on image data captured using multiple imaging sensors. The apparatus also includes at least one processor configured to divide each of the input images into multiple overlapping sub-images, generate multiple overlapping sub-image gain maps based on the sub-images, and combine the sub-image gain maps to produce a final gain map identifying relative gains of the imaging sensors. The at least one processor is configured to combine an adjacent and overlapping pair of sub-image gain maps by renormalizing gain values in at least one of the pair of sub-image gain maps so that average gain values in overlapping regions of the pair of sub-image gain maps are equal or substantially equal.

In a third embodiment, a non-transitory computer readable medium contains instructions that when executed cause at least one processor to obtain multiple spatially-displaced input images of a scene based on image data captured using multiple imaging sensors. The medium also contains instructions that when executed cause the at least one processor to divide each of the input images into multiple overlapping sub-images. The medium further contains instructions that when executed cause the at least one processor to generate multiple overlapping sub-image gain maps based on the sub-images. In addition, the medium contains instructions that when executed cause the at least one processor to combine the sub-image gain maps to produce a final gain map identifying relative gains of the imaging sensors. The instructions that when executed cause the at least one processor to combine the sub-image gain maps include instructions that when executed cause the at least one processor to renormalize gain values in at least one of a pair of sub-image gain maps so that average gain values in overlapping regions of the pair of sub-image gain maps are equal or substantially equal.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1:
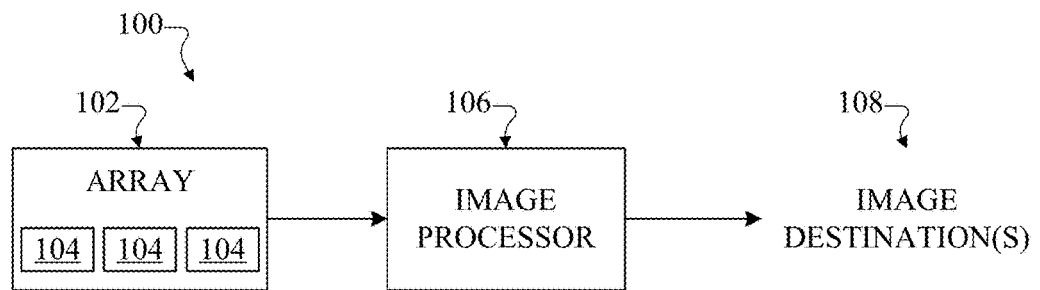
FIG. 1 illustrates an example system supporting a parallelization technique for gain map generation using overlapping sub-images in accordance with this disclosure.

FIGS. 1 through 7, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

As noted above, an imaging system often uses an array of imaging sensors to capture images of scenes, such as when an imaging system uses a two-dimensional array of imaging sensors to capture images of the sky, Earth, or space. However, in various imaging systems, different imaging sensors in an array may generate different output values even when receiving the exact same inputs. For instance, different imaging sensors may output different values even when viewing a completely uniform portion of the sky, Earth, or space. This is often due to the different imaging sensors having different gains, which causes the imaging sensors to output different values.

Various approaches have been developed to generate a "gain map" for an array or other collection of imaging sensors, where the gain map identifies relative gains of the imaging sensors. In other words, these approaches can be used to generate a gain map that identifies the spatial nonuniformity of the imaging sensors. Some of these approaches operate using multiple images of a scene, where the images are spatially displaced from one another (meaning the images are shifted so that the images are not captured of the exact same portion of the scene). One benefit of these approaches is that a gain map can be generated directly from images that are captured using imaging sensors and without requiring the use of a special reference (such as a uniformly-illuminated scene). Unfortunately, these approaches use information from neighboring pixels and are not easily compatible with a "parallelization" technique, meaning these approaches cannot break the gain map generation process into separate processing tasks for execution by different processors or different processing cores.

This disclosure provides a parallelization technique for gain map generation using overlapping sub-images. As described below, problems can be experienced if a collection of images are simply broken into multiple sub-images, where multiple sub-image gain maps are generated for different groups of sub-images in parallel and the sub-image gain maps are then stitched together into a final gain map. This is because all sub-image gain maps that are produced may have the same average gain value (such as an average gain value of 1.0) locally within each of the sub-image gain maps, but this is accomplished by normalizing each of the sub-image gain maps individually. Because of this, stitching together the sub-image gain maps can result in noticeable boundary artifacts at the boundaries of the sub-image gain maps.

The parallelization technique described in this disclosure breaks up each image in a collection of input images into overlapping sub-images, where the sub-images overlap by a relatively small amount (such as by a limited number of pixels). Multiple sub-image gain maps are generated using different sub-images, which can occur in parallel. Part of the generation of the sub-image gain maps can include normalizing the gain values in each individual sub-image gain map so that each sub-image gain map has a desired average gain value (such as an average gain value of 1.0). One or more of the sub-image gain maps can also be processed to renormalize the sub-image gain map(s) so that the sub-image gain maps can be combined into a final gain map that lacks boundary artifacts or other associated artifacts. In this way, the process for generating a final gain map for an array or other collection of imaging sensors can be broken up into different processing tasks that can be parallelized, allowing the gain map to be generated much faster. This can be particularly useful in imaging systems that have large arrays of imaging sensors, such as in imaging systems that have a wide field of view.

FIG. 1 illustrates an example system 100 supporting a parallelization technique for gain map generation using overlapping sub-images in accordance with this disclosure. As shown in FIG. 1, the system 100 includes an array 102 of imaging sensors 104 and an image processor 106. The array 102 represents a collection of multiple imaging sensors 104, which are used to generate image data defining captured images of scenes. Each imaging sensor 104 represents a device configured to generate at least one pixel of image data. The array 102 may include any suitable number of imaging sensors 104 in any suitable arrangement. In some cases, for instance, the array 102 may include a two-dimensional arrangement of imaging sensors 104, and the imaging sensors 104 may be arranged in rows and columns.

Each imaging sensor 104 includes any suitable structure configured to generate outputs based on incoming illumination, such as a charge-coupled device (CCD), a complementary metal oxide semiconductor (CMOS) device, or a charge injection device (CID). Note that the imaging sensors 104 may be used to generate images in any suitable wavelength range(s), such as visible, infrared, and/or ultraviolet images.

The image processor 106 processes the image data generated by the array 102 of imaging sensors 104 in order to generate images of scenes. For example, the image processor 106 can operate to convert output values generated by the imaging sensors 104 into visible, infrared, and/or ultraviolet images of scenes. The resulting images can be used by the image processor 106 to perform one or more functions, or the resulting images can be output to one or more destinations 108 for storage or use. Note that images of scenes may be used for numerous purposes, and this disclosure is not limited to any particular use of the images.

As described in more detail below, the image processor 106 supports a parallelization technique in which each input image in a collection of spatially-displaced input images is divided into multiple overlapping sub-images, where multiple overlapping sub-image gain maps are generated using the sub-images. The overlapping sub-image gain maps are processed and combined in order to generate a final gain map, which identifies relative gains of the imaging sensors 104 in the array 102. Part of the processing and combination of the sub-image gain maps includes renormalizing one or more of the sub-image gain maps based on the relative gains of the sub-image gain maps within their overlapping regions, which reduces or eliminates boundary artifacts or other artifacts in the final gain map. This allows the final gain map to accurately identify relative differences in gain across the various imaging sensors 104 of the array 102 while being produced using parallel processing, which can significantly speed up the generation of the final gain map. The final gain map may be used to process and modify additional images captured by the array 102 of imaging sensors 104, which can help make the captured images more accurate. The image processor 106 includes any suitable structure configured to process images to generate gain maps for the array 102 of imaging sensors 104.

Although FIG. 1 illustrates one example of a system 100 supporting a parallelization technique for gain map generation using overlapping sub-images, various changes may be made to FIG. 1. For example, the image processor 106 may be coupled to or otherwise used with multiple arrays 102 of imaging sensors 104. Also, the functionality of the image processor 106 may be divided into multiple physical components, such as when one or more components process image data from the imaging sensors 104 to generate images and when one or more other components process the generated images to identify gain maps.

Figure 2:
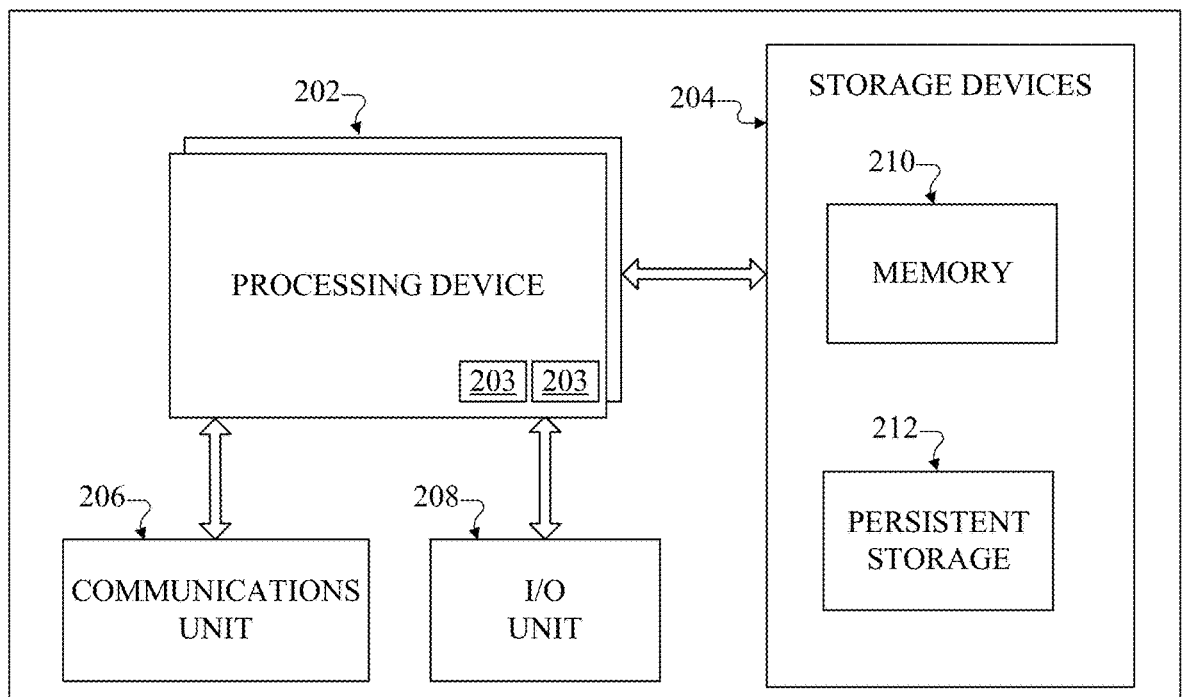
FIG. 2 illustrates an example device supporting a parallelization technique for gain map generation using overlapping sub-images in accordance with this disclosure.

FIG. 2 illustrates an example device 200 supporting a parallelization technique for gain map generation using overlapping sub-images in accordance with this disclosure. One or more instances of the device 200 may, for example, be used to at least partially implement the functionality of the image processor 106 of FIG. 1. However, the functionality of the image processor 106 may be implemented in any other suitable manner.

As shown in FIG. 2, the device 200 denotes a computing device or system that includes at least one processing device 202, at least one storage device 204, at least one communications unit 206, and at least one input/output (I/O) unit 208. The processing device(s) 202 may execute instructions that can be loaded into at least one memory 210. The one or more processing devices 202 include any suitable number(s) and type(s) of processors or other processing devices in any suitable arrangement. Example types of processing devices 202 include one or more microprocessors, microcontrollers, digital signal processors (DSPs), application specific integrated circuits (ASICs), field programmable gate arrays (FPGAs), or discrete circuitry. Note that the device 200 may include a single processing device 202 with multiple processing cores 203, multiple processing devices 202 each with a single processing core 203, multiple processing devices 202 each with multiple processing cores 203, or any combination thereof. In general, the device 200 includes multiple processing devices 202 and/or multiple processing cores 203 that can be used to parallelize at least part of a gain map generation process.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices, such as the array 102 of imaging sensors 104 or the one or more destinations 108. For example, the communications unit 206 can include a network interface card or a wireless transceiver facilitating communications over a wired or wireless network or other communication link(s). The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display or other suitable output device. Note, however, that the I/O unit 208 may be omitted if the device 200 does not require local I/O, such as when the device 200 represents a server or other device that can be accessed remotely.

In some embodiments, the instructions executed by the processing device 202 include instructions that implement the functionality of the image processor 106. Thus, for example, the instructions executed by the processing device 202 may cause the device 200 to obtain multiple spatially-displaced input images and divide each input image into multiple overlapping sub-images. The instructions executed by the processing device 202 may also cause the device 200 to generate multiple overlapping sub-image gain maps using the overlapping sub-images and renormalize one or more of the sub-image gain maps so that the sub-image gain maps can be combined into a final gain map. The instructions executed by the processing device 202 may further cause the device 200 to output or use the final gain map.

Although FIG. 2 illustrates one example of a device 200 supporting a parallelization technique for gain map generation using overlapping sub-images, various changes may be made to FIG. 2. For example, computing and processing devices and systems come in a wide variety of configurations, and FIG. 2 does not limit this disclosure to any particular computing or processing device or system.

Figure 3A:
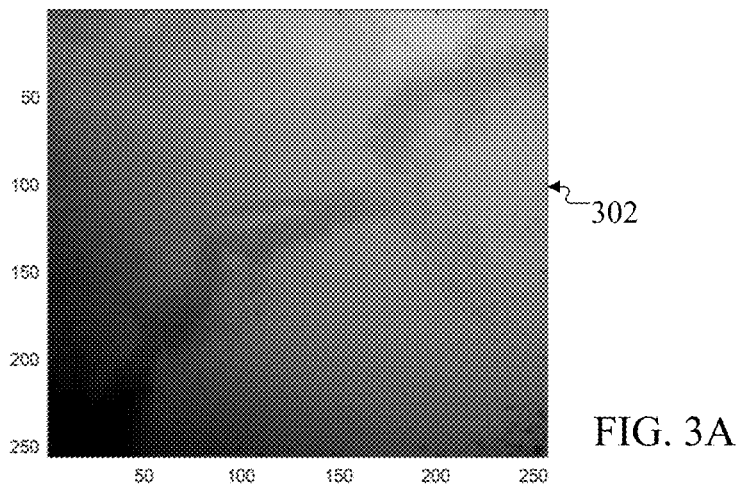
FIGS. 3A through 3C illustrate example input images for use in a parallelization technique for gain map generation using overlapping sub-images in accordance with this disclosure.
Figure 3B:
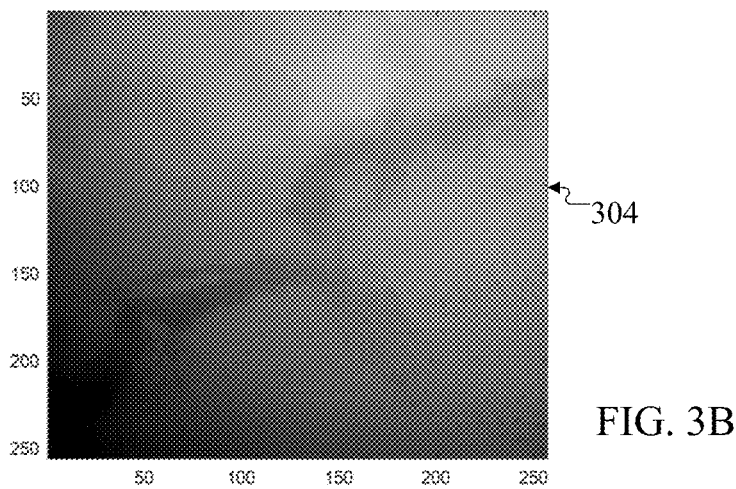
Figure 3C:
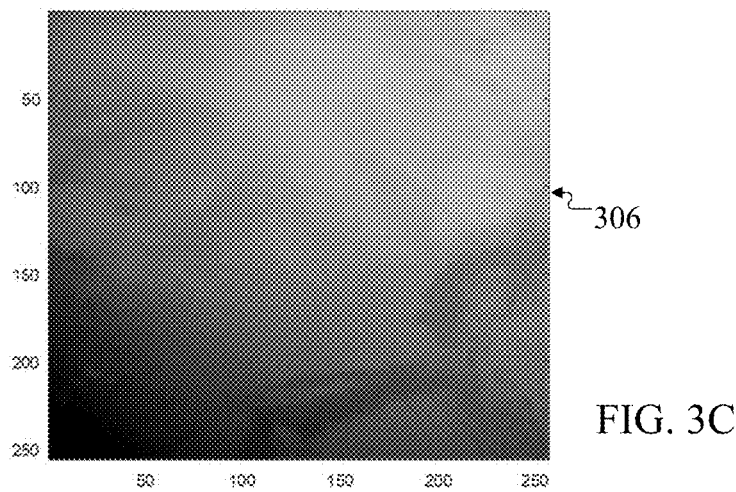

FIGS. 3A through 3C illustrate example input images 302, 304, 306 for use in a parallelization technique for gain map generation using overlapping sub-images in accordance with this disclosure. For ease of explanation, the input images 302, 304, 306 are described as being captured using the array 102 of imaging sensors 104 and processed using the image processor 106 (which may be implemented using the device 200 of FIG. 2) in the system 100 of FIG. 1. However, the input images 302, 304, 306 may be generated using any suitable imaging device(s) and processed using any suitable image processing device(s) in any suitable system(s).

As shown in FIGS. 3A through 3C, the input images 302, 304, 306 represent spatially-displaced images captured of the same scene. That is, the input images 302, 304, 306 capture different overlapping portions of the same scene. This can be achieved in various ways, such as by moving the array 102 of imaging sensors 104 on a larger device or system (such as an airplane, satellite, or other vehicle) or moving the larger device or system itself so that the array 102 views different portions of the same scene. Each input image 302, 304, 306 can be captured using any suitable image capture settings, such as any suitable exposure and any suitable resolution.

Figure 4:
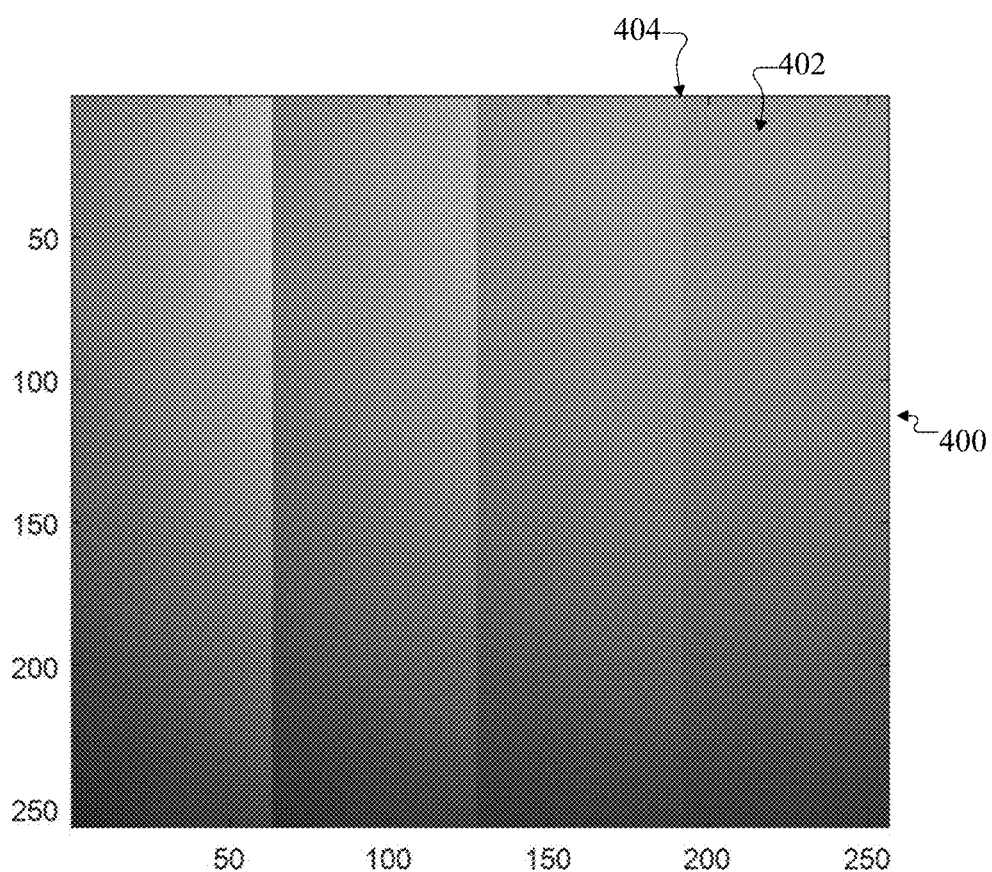
FIG. 4 illustrates an example gain map generated using non-overlapping sub-images in input images.

The collection of input images 302, 304, 306 is used to generate a gain map for the array 102 of imaging sensors 104 that captured the input images, where the gain map identifies the relative gains of the imaging sensors 104 in the array 102. However, as noted above, generating a gain map using a parallelization technique can be problematic. For example, assume each input image 302, 304, 306 is divided into four equally-sized non-overlapping rectangular regions positioned side-by-side and extending top-to-bottom along their longer dimension. Generating sub-image gain maps using these rectangular sub-images and stitching the sub-image gain maps together can create noticeable boundary artifacts at the boundaries of the sub-image gain maps. An example of this is shown in FIG. 4, which illustrates an example gain map 400 generated using non-overlapping sub-images in input images 302, 304, 306. As can be seen in FIG. 4, the gain map 400 can be produced by generating four different sub-image gain maps 402 in parallel, such as by using different threads executed by different processing devices 202 or different processing cores 203. Unfortunately, the sub-image gain maps 402 are each normalized individually to have a desired average gain value, such as an average gain value of 1.0. The sub-image gain maps 402 are not normalized across the entire gain map 400. As a result, when the sub-image gain maps 402 are combined, boundary artifacts 404 are visible at the boundaries of the different sub-image gain maps 402 because the gain values in all of the sub-image gain maps 402 were not normalized collectively as a group.

Figure 5A:
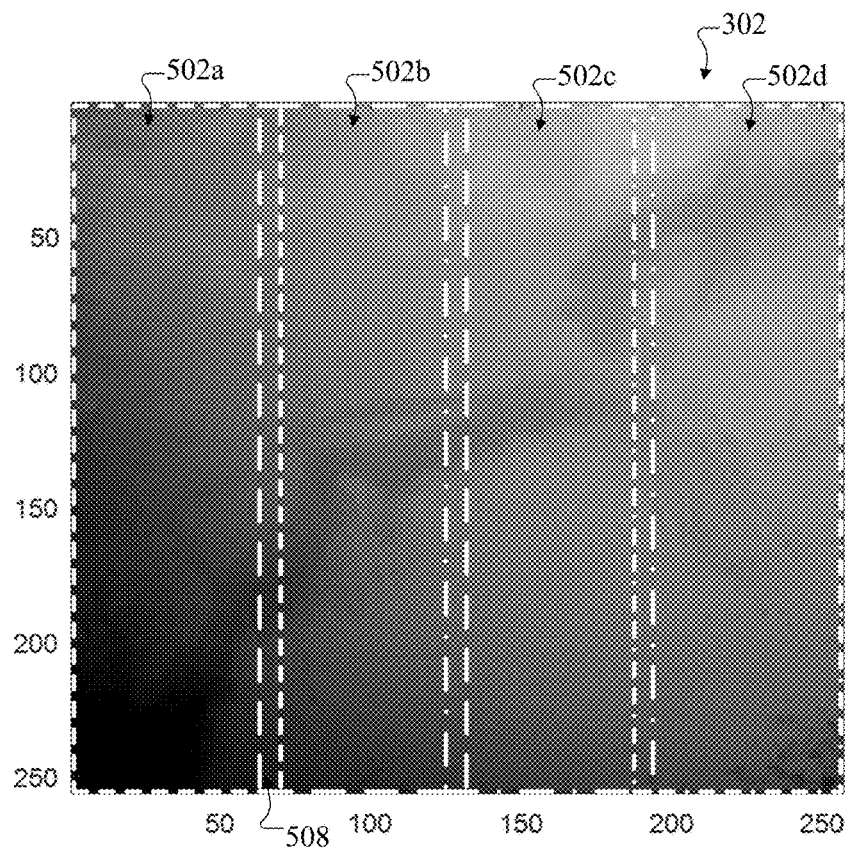
FIGS. 5A through 5C illustrate an example definition of overlapping sub-images in input images in accordance with this disclosure.
Figure 5B:
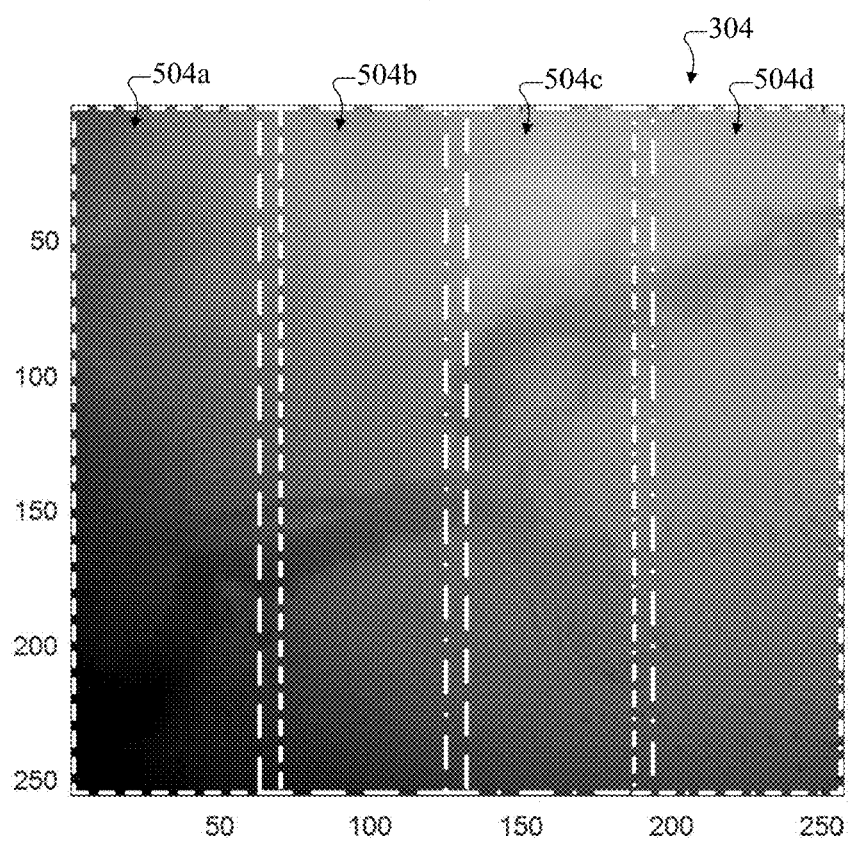
Figure 5C:
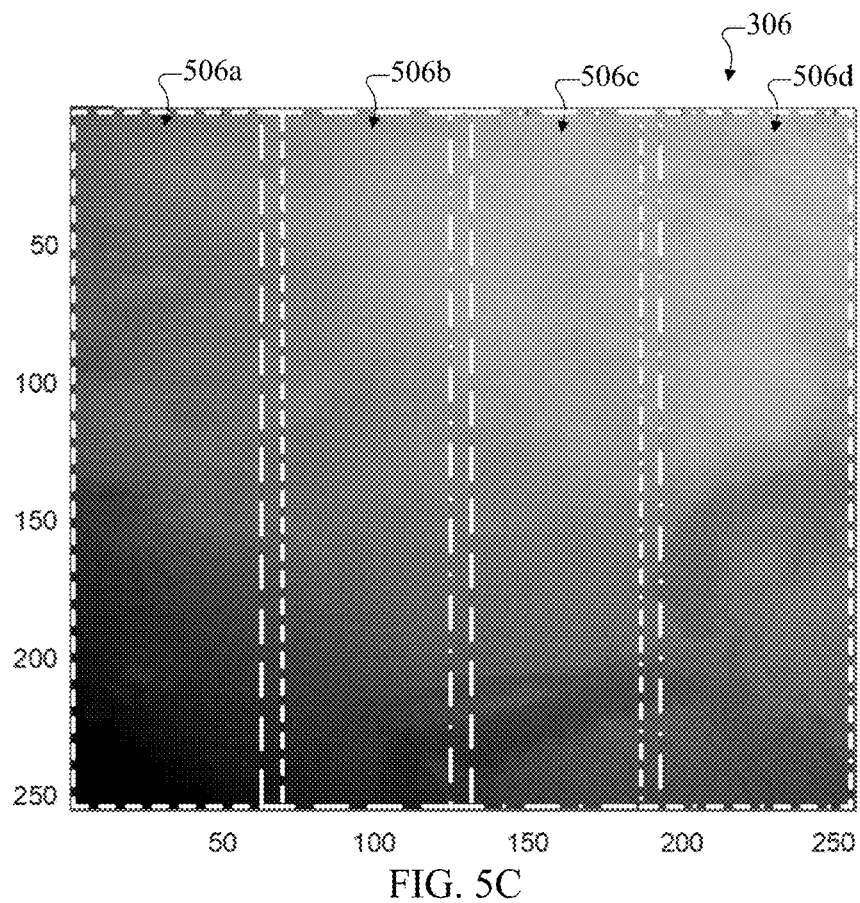

In accordance with this disclosure, a parallelization technique can be used to generate overlapping sub-image gain maps, which are processed in order to reduce or eliminate these types of artifacts. FIGS. 5A through 5C illustrate an example definition of overlapping sub-images in the input images 302, 304, 306 in accordance with this disclosure. In particular, the image 302 has been divided into four overlapping sub-images 502a-502d in FIG. 5A, the image 304 has been divided into four overlapping sub-images 504a-504d in FIG. 5B, and the image 306 has been divided into four overlapping sub-images 506a-506d in FIG. 5C. The groups of sub-images 502a-502d, 504a-504d, 506a-506d are aligned with each other across the input images 302, 304, 306. This means that the sub-images 502a, 504a, 506a encompass the same pixel positions in the input images 302, 304, 306, and the sub-images 502b, 504b, 506b encompass the same pixel positions in the input images 302, 304, 306. Similarly, this means that the sub-images 502c, 504c, 506c encompass the same pixel positions in the input images 302, 304, 306, and the sub-images 502d, 504d, 506d encompass the same pixel positions in the input images 302, 304, 306, The sub-images 502a, 504a, 506a can be provided to and processed by a first processing device 202 or processing core 203, allowing a first sub-image gain map to be generated. The sub-images 502b, 504b, 506b can be provided to and processed by a second processing device 202 or processing core 203, allowing a second sub-image gain map to be generated. The sub-images 502c, 504c, 506c can be provided to and processed by a third processing device 202 or processing core 203, allowing a third sub-image gain map to be generated. The sub-images 502d, 504d, 506d can be provided to and processed by a fourth processing device 202 or processing core 203, allowing a fourth sub-image gain map to be generated. This can be done in parallel (such as by using different threads executed by different processing devices 202 or different processing cores 203), which allows the four sub-image gain maps to be generated in parallel or at least in a partially overlapping manner. Each sub-image gain map includes multiple gain values (typically one gain value per pixel in the associated sub-images), and the sub-image gain maps may each be individually normalized so that each sub-image gain map has a desired average gain value (such as an average gain value of 1.0). Note that the resulting sub-image gain maps will overlap since the image data used to produce the sub-image gain maps also overlaps. In this example, each pair of adjacent sub-images 502a-502b, 502b-502c, 502c-502d, 504a-504b, 504b-504c, 504c-504d, 506a-506b, 506b-506c, 506c-506d overlap in a specified region 508, and each pair of adjacent sub-image gain maps may overlap in a similar manner.

Any suitable technique may be used to produce overlapping sub-image gain maps using the overlapping sub-images 502a-502d, 504a-504d, 506a-506d. One example approach that has been developed and that may be used here is the technique described by Kuhn, Lin, & Loranz, "Gain Calibrating Nonuniform Image-Array Data Using Only The Image Data," Publications of the Astronomical Society of the Pacific, Vol. 103, No. 668, October 1991, pages 1097-1108 (which is hereby incorporated by reference in its entirety). This approach is sometimes referred to as the "KLL" technique. Another example approach that has been developed and that may be used here is the technique described by Toussaint, Harvey, & Toussaint, "Improved Convergence for the CCD Gain Calibration Using Simultaneous-Overrelaxation Techniques," The Astronomical Journal, Vol. 126, No. 2, August 2003, pages 1112-1118 (which is hereby incorporated by reference in its entirety). This approach applies an analytic solution method called the "SOR" technique to the basic KLL algorithm. However, note that any other suitable technique may be used here to produce sub-image gain maps.

Once multiple sub-image gain maps have been generated, the gain values in one or more of the sub-image gain maps can be renormalized, and the original and/or renormalized sub-image gain maps can be combined to produce a final gain map. For example, assume first and second adjacent sub-image gain maps that overlap are to be combined. The average of the gain values in the first sub-image gain map (in the region where the first gain map overlaps the second gain map) can be determined, and the average of the gain values in the second sub-image gain map (in the region where the second gain map overlaps the first gain map) can be determined. Even though both sub-image gain maps may each have the same average gain value overall, the gain values in the overlapping regions may not be equal. A difference between these two average gain values indicates that the two sub-image gain maps have different gain values in their overlapping regions, which can prevent a simple concatenation or combination of the two sub-image gain maps. Thus, the average gain values can be used to identify at least one scaling factor that is applied to all gain values in at least one of the two sub-image gain maps during a renormalization, which (ideally) causes the two sub-image gain maps to have equal or substantially equal average gain values within their overlapping regions. Substantially equal average gain values here may refer to average gain values that are similar enough so that no visible artifacts are created when the sub-image gain maps are combined. This allows the two sub-image gain maps to then be combined with few if any artifacts into an intermediate gain map. This process may then be repeated to combine the intermediate gain map with another adjacent and overlapping sub-image gain map, thereby producing an updated intermediate gain map. Eventually, all sub-image gain maps have been combined into a final intermediate gain map. At that point, the final intermediate gain map can be renormalized (if necessary) so that all gain values collectively have a desired average gain value (such as an average gain value of 1.0), and the resulting gain values can be output as a final gain map.

The scaling of gain values for two adjacent and overlapping sub-image gain maps can occur in various ways. In some embodiments, for simplicity, this may involve applying a single scaling factor to scale the gain values in only one of the two sub-image gain maps so that the gain values in the overlapping regions are equal or substantially equal. In other embodiments, different scaling factors can be applied to scale the gain values in both sub-image gain maps so that the gain values in the overlapping regions are equal or substantially equal. However performed, the purpose of the scaling is to renormalize the gain values in at least one of the two sub-image gain maps so that the average gain values in the two overlapping regions of the two sub-image gain maps are equal or substantially equal.

As a particular example of this process, consider the following. A first sub-image gain map generated using the sub-images 502a, 504a, 506a can be combined with a second sub-image gain map generated using the sub-images 502b, 504b, 506b. This can be accomplished in some cases by renormalizing the gain values in the second sub-image gain map so that (after renormalization) its average gain value matches or closely matches the average gain value of the first sub-image gain map in the overlapping regions of the sub-image gain maps. This can be accomplished in other cases by renormalizing the gain values in the first and second sub-image gain maps so that (after renormalization) their average gain values match or closely match in the overlapping regions of the sub-image gain maps. After renormalization, the first and second sub-image gain maps can be combined, and the result is a first intermediate gain map that includes gain values based on two of the four original sub-image gain maps. The first intermediate gain map can then be combined with a third sub-image gain map generated using the sub-images 502c, 504c, 506c following a similar process. The result is a second intermediate gain map that includes gain values based on three of the four original sub-image gain maps. The second intermediate gain map can then be combined with a fourth sub-image gain map generated using the sub-images 502d, 504d, 506d following a similar process. The result is a third intermediate gain map that includes gain values based on all four original sub-image gain maps. The third intermediate gain map can be renormalized if needed so that all gain values in the third intermediate gain map have a desired average value. This results in a final gain map, which can be stored, output, or used in any other suitable manner.

Figure 6:
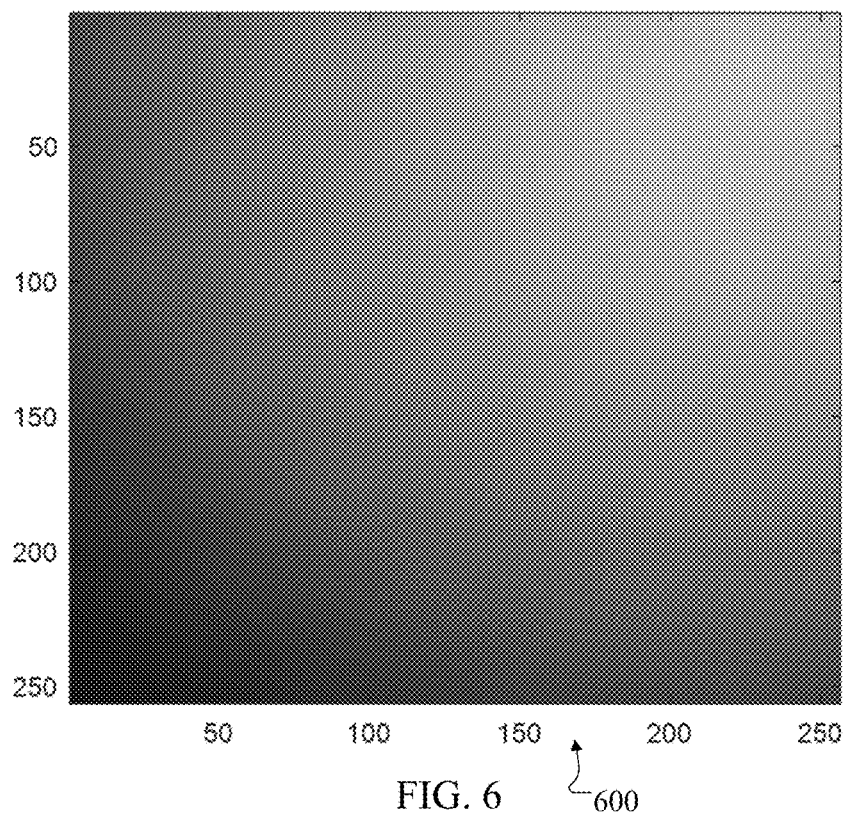
FIG. 6 illustrates an example gain map generated using overlapping sub-images in input images in accordance with this disclosure.

FIG. 6 illustrates an example gain map 600 generated using overlapping sub-images in input images in accordance with this disclosure. For example, the gain map 600 may be generated using the input images 302, 304, 306 that are divided into the sub-images 502a-502d, 504a-504d, 506a-506d as described above. As can be seen in FIG. 6, the gain map 600 here is much smoother and lacks noticeable boundaries where the sub-images 502a-502d, 504a-504d, 506a-506d were defined (compared to the gain map 400 in FIG. 4). The overlapping of the sub-images 502a-502d, 504a-504d, 506a-506d and the renormalization of at least some of the resulting sub-image gain maps help to smooth the transitions between the sub-image gain maps when producing the final gain map 600.

Note that while each input image 302, 304, 306 here is divided into four sub-images 502a-502d, 504a-504d, 506a-506d, respectively, this is for illustration only. Each input image 302, 304, 306 may be divided into any suitable number of sub-images, including two, three, or more than four sub-images. Also note that while the sub-images 502a-502d, 504a-504d, 506a-506d here are formed as rectangular regions that are elongated in the vertical direction, this is for illustration only. Each input image 302, 304, 306 may be divided into sub-images having any other suitable regular or irregular shapes. As particular examples, each input image 302, 304, 306 may be divided into sub-images representing square regions or rectangular regions that are elongated in the horizontal direction.

Further, note that the gain values in at least some of the sub-image gain maps may be renormalized in any suitable manner so that the sub-image gain maps can be combined to form a final gain map. For instance, while described above as starting with one sub-image gain map and moving in a specific direction to combine additional sub-image gain maps, there is no requirement to start with any particular sub-image gain map or to move in any particular direction or even a single direction. As long as a sub-image gain map is combined with a neighboring sub-image gain map based on a renormalization of gain values in at least one of the sub-image gain maps, the selection of an initial sub-image gain map and the movement direction are immaterial. There is also no requirement to renormalize only one sub-image gain map during a combination with another sub-image gain map since both sub-image gain maps may be renormalized. In general, as long as one or more of multiple sub-image gain maps can be adjusted so that the sub-image gain maps have an equal or substantially equal gain value in their overlapping regions, the sub-image gain maps can be combined. In addition, note that the amount of overlap between the sub-images 502a-502d, 504a-504d, 506a-506d can be relatively small. For example, in some cases, boundaries of two neighboring sub-images can overlap by eight to sixteen pixels, although other amounts of overlap may also be used.

Although FIGS. 3A through 3C illustrate one example of input images 302, 304, 306 for use in a parallelization technique for gain map generation using overlapping sub-images, various changes may be made to FIGS. 3A through 3C. For example, the contents of the input images 302, 304, 306 are merely for illustration and explanation, and the contents of input images used in any particular implementation can vary widely. Although FIG. 4 illustrates one example of a gain map 400 generated using non-overlapping sub-images in input images, various changes may be made to FIG. 4. For example, the boundary artifacts 404 here have been emphasized for clarity and ease of explanation, and boundary artifacts in other gain maps generated using non-overlapping sub-images may be more or less visible. Although FIGS. 5A through 5C illustrate one example of the definition of overlapping sub-images 502a-502d, 504a-504d, 506a-506d in input images 302, 304, 306, various changes may be made to FIGS. 5A through 5C. For example, the contents of the input images 302, 304, 306 are merely for illustration and explanation, and the contents of input images used in any particular implementation can vary widely. Also, the definition of the overlapping sub-images 502a-502d, 504a-504d, 506a-506d can vary in any number of ways. As particular examples, there may be more or less sub-images defined, and the sub-images that are defined may or may not be rectangular. Although FIG. 6 illustrates one example of a gain map 600 generated using overlapping sub-images 502a-502d, 504a-504d, 506a-506d in input images 302, 304, 306, various changes may be made to FIG. 6. For example, the contents of the gain map 600 are merely for illustration and explanation, and the contents of a gain map produced in any particular implementation can vary widely.

Figure 7:
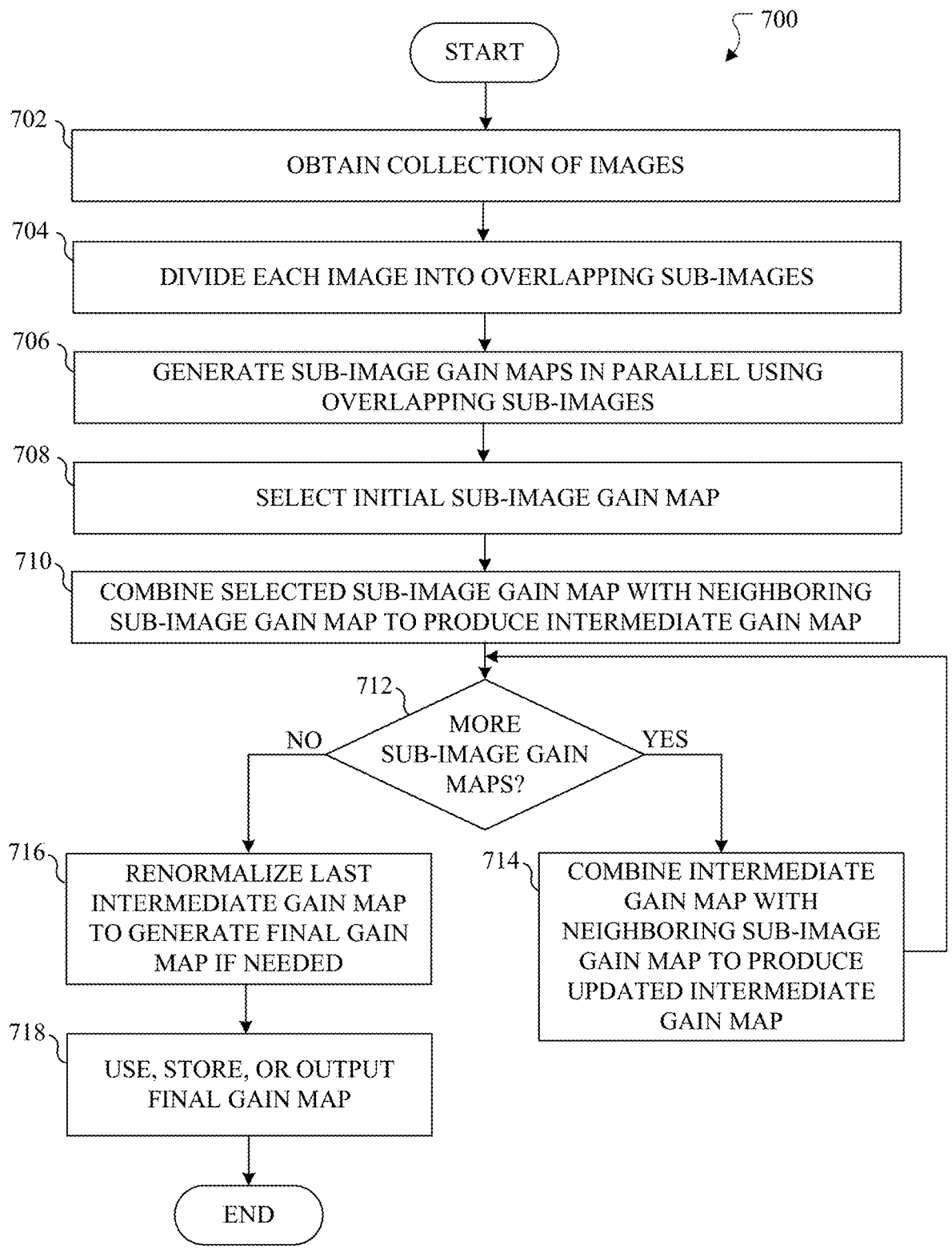
FIG. 7 illustrates an example method for supporting a parallelization technique for gain map generation using overlapping sub-images in accordance with this disclosure.

FIG. 7 illustrates an example method 700 for supporting a parallelization technique for gain map generation using overlapping sub-images in accordance with this disclosure. For ease of explanation, the method 700 is described as being performed using the image processor 106 of FIG. 1, which may be implemented using the device 200 of FIG. 2. However, the method 700 may be performed using any suitable device(s) in any suitable system(s).

As shown in FIG. 7, a collection of input images is obtained at step 702. This may include, for example, the image processor 106 obtaining image data from the array 102 of imaging sensors 104 and generating multiple spatially-displaced input images. Note, however, that the image processor 106 may also obtain the collection of spatially-displaced input images from another source, such as from storage or from another device that generates the input images.

Each input image is divided into multiple overlapping sub-images at step 704. This may include, for example, the image processor 106 generating boundaries for multiple groups of pixels within each input image, where the groups of pixels cover the same pixel positions for each of the input images. As a particular example, this may include the image processor 106 generating boundaries for multiple vertical rectangular groups of pixels, multiple horizontal rectangular groups of pixels, or multiple square groups of pixels within each input image, although any other suitable regular or irregular shapes may be used here. As noted above, the amount of overlap can vary depending on the circumstances and, in some cases, eight to sixteen pixels worth of overlap can occur with the boundaries of neighboring sub-images.

Overlapping sub-image gain maps are generated in parallel for different groups of overlapping sub-images at step 706. This may include, for example, the image processor 106 performing the basic KLL technique or application of the SOR method to the KLL technique in order to generate multiple overlapping sub-image gain maps using the overlapping sub-images. Since this can be done in parallel (or otherwise in an at least partially overlapping manner), the sub-image gain maps can be generated more quickly compared to a serial approach.

The overlapping sub-image gain maps are combined to produce a final gain map based on the collection of input images. This is accomplished by selecting an initial sub-image gain map at step 708. This may include, for example, the image processor 106 selecting one of the sub-image gain maps randomly or selecting a specific sub-image gain map, such as the left-most, right-most, top-most, or bottom-most sub-image gain map. The selected sub-image gain map is combined with a neighboring (overlapping) sub-image gain map to produce an intermediate gain map at step 710. This may include, for example, the image processor 106 renormalizing the gain values in at least one of the two sub-image gain maps so that the average values of the sub-image gain maps in their overlapping regions is equal or substantially equal. This may also include the image processor 106 combining the gain values after renormalization to produce the intermediate gain map. If additional sub-image gain maps remain to be processed at step 712, the current intermediate gain map is combined with a neighboring (overlapping) sub-image gain map to produce an updated intermediate gain map at step 714. This may include, for example, the image processor 106 renormalizing the gain values in at least one of the prior version of the intermediate gain map or the neighboring sub-image gain map so that the average values in their overlapping regions are equal or substantially equal. This process may continue until all sub-image gain maps have been combined into an intermediate gain map.

Once all sub-image gain maps have been combined, the last version of the intermediate gain map can be renormalized (if necessary) at step 716. This may include, for example, the image processor 106 renormalizing the gain values in the last version of the intermediate gain map so that the gain values have a desired average value (such as 1.0). The result is a final gain map, which has been normalized to obtain a desired average value across the entire gain map (rather than in separate portions). The final gain map can be used, stored, or output in any suitable manner at step 718. This may include, for example, the image processor 106 storing the final gain map in a memory, using the final gain map to perform some function, or outputting the final gain map to one or more destinations 108.

Although FIG. 7 illustrates one example of a method 700 for supporting a parallelization technique for gain map generation using overlapping sub-images, various changes may be made to FIG. 7. For example, while shown as a series of steps, various steps in FIG. 7 may overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
obtaining multiple spatially-displaced input images of a scene based on image data captured using multiple imaging sensors, at least two of the multiple imaging sensors having different gains;
dividing each of the input images into multiple overlapping sub-images;
generating multiple overlapping sub-image gain maps based on the sub-images, wherein each sub-image gain map is generated using the sub-images in same divided positions within each of the input images and different sub-image gain maps are generated using the sub-images in different divided positions within each of the input images; and
combining the sub-image gain maps to produce a final gain map identifying relative gains of the imaging sensors with respect to one another, wherein an adjacent and overlapping pair of sub-image gain maps are combined by renormalizing gain values in at least one of the pair of sub-image gain maps so that average gain values in overlapping regions of the pair of sub-image gain maps are equal or substantially equal.

2. The method of claim 1, wherein generating the multiple overlapping sub-image gain maps comprises generating the multiple overlapping sub-image gain maps in parallel using multiple processors or multiple processing cores.

3. The method of claim 1, wherein combining the sub-image gain maps comprises:
   combining the pair of sub-image gain maps to produce a first intermediate gain map; and
   combining the first intermediate gain map with a third sub-image gain map to produce a second intermediate gain map by renormalizing gain values in at least one of the first intermediate gain map and the third sub-image gain map.

4. The method of claim 3, further comprising:
   renormalizing gain values in a last intermediate gain map to produce the final gain map.

5. The method of claim 1, wherein:
   each sub-image gain map is normalized to have an average gain value equal to a specified value; and
   at least one of the average gain values in the overlapping regions of the pair of sub-image gain maps is not equal to the specified value prior to the renormalization.

6. The method of claim 1, wherein the overlapping sub-images comprise overlapping rectangular sub-images.

7. The method of claim 1, wherein boundaries of the sub-images overlap by between eight to sixteen pixels.

8. An apparatus comprising:
   at least one memory configured to store multiple spatially-displaced input images of a scene based on image data captured using multiple imaging sensors, at least two of the multiple imaging sensors having different gains; and
   at least one processor configured to:
   divide each of the input images into multiple overlapping sub-images;
   generate multiple overlapping sub-image gain maps based on the sub-images; and
   combine the sub-image gain maps to produce a final gain map identifying relative gains of the imaging sensors with respect to one another;
   wherein the at least one processor is configured to combine an adjacent and overlapping pair of sub-image gain maps by renormalizing gain values in at least one of the pair of sub-image gain maps so that average gain values in overlapping regions of the pair of sub-image gain maps are equal or substantially equal; and
   wherein the at least one processor is configured to generate each sub-image gain map using the sub-images in same divided positions within each of the input images and to generate different sub-image gain maps using the sub-images in different divided positions within each of the input images.

9. The apparatus of claim 8, wherein the at least one processor comprises multiple processors, multiple processing cores, or both configured to generate the multiple overlapping sub-image gain maps in parallel.

10. The apparatus of claim 8, wherein, to combine the sub-image gain maps, the at least one processor is configured to:
    combine the pair of sub-image gain maps to produce a first intermediate gain map; and
    combine the first intermediate gain map with a third sub-image gain map to produce a second intermediate gain map by renormalizing gain values in at least one of the first intermediate gain map and the third sub-image gain map.

11. The apparatus of claim 10, wherein the at least one processor is further configured to renormalize gain values in a last intermediate gain map to produce the final gain map.

12. The apparatus of claim 8, wherein:
    the at least one processor is configured to normalize each sub-image gain map to have an average gain value equal to a specified value; and
    at least one of the average gain values in the overlapping regions of the pair of sub-image gain maps is not equal to the specified value prior to the renormalization.

13. The apparatus of claim 8, wherein the overlapping sub-images comprise overlapping rectangular sub-images.

14. The apparatus of claim 8, wherein boundaries of the sub-images overlap by between eight to sixteen pixels.

15. A non-transitory computer readable medium containing instructions that when executed cause at least one processor to:
    obtain multiple spatially-displaced input images of a scene based on image data captured using multiple imaging sensors, at least two of the multiple imaging sensors having different gains;
    divide each of the input images into multiple overlapping sub-images;
    generate multiple overlapping sub-image gain maps based on the sub-images; and
    combine the sub-image gain maps to produce a final gain map identifying relative gains of the imaging sensors with respect to one another;
    wherein the instructions that when executed cause the at least one processor to combine the sub-image gain maps comprise:
    instructions that when executed cause the at least one processor to renormalize gain values in at least one of a pair of sub-image gain maps so that average gain values in overlapping regions of the pair of sub-image gain maps are equal or substantially equal; and
    wherein the instructions that when executed cause the at least one processor to generate the sub-image gain maps comprise:
    instructions that when executed cause the at least one processor to generate each sub-image gain map using the sub-images in same divided positions within each of the input images and to generate different sub-image gain maps using the sub-images in different divided positions within each of the input images.

16. The non-transitory computer readable medium of claim 15, wherein the instructions that when executed cause the at least one processor to combine the sub-image gain maps further comprise:
    instructions that when executed cause the at least one processor to:
    combine the pair of sub-image gain maps to produce a first intermediate gain map; and
    combine the first intermediate gain map with a third sub-image gain map to produce a second intermediate gain map by renormalizing gain values in at least one of the first intermediate gain map and the third sub-image gain map.

17. The non-transitory computer readable medium of claim 16, further containing instructions that when executed cause the at least one processor to renormalize gain values in a last intermediate gain map to produce the final gain map.

18. The non-transitory computer readable medium of claim 15, further containing instructions that when executed cause the at least one processor to normalize each sub-image gain map to have an average gain value equal to a specified value;

wherein at least one of the average gain values in the overlapping regions of the pair of sub-image gain maps is not equal to the specified value prior to the renormalization.

19. The non-transitory computer readable medium of claim 15, wherein the overlapping sub-images comprise overlapping rectangular sub-images.

20. The non-transitory computer readable medium of claim 15, wherein boundaries of the sub-images overlap by between eight to sixteen pixels.

* * * * *